United States Patent
Schafheutle et al.

(10) Patent No.: US 7,157,519 B2
(45) Date of Patent: Jan. 2, 2007

(54) HIGH MOLAR MASS POLYURETHANE DISPERSIONS

(75) Inventors: Markus A. Schafheutle, Graz (AT); Anton Arzt, Neutillitsch (AT); Julius Burkl, Graz (AT); Martina Glettler, Graz (AT); Gerlinde Petritsch, Graz (AT); Joerg Wango, Wundschuh (AT)

(73) Assignee: Solutia Austria GmbH (AT)

( * ) Notice: Subject to any disclaimer, the term of this patent is extended or adjusted under 35 U.S.C. 154(b) by 0 days.

(21) Appl. No.: 10/256,929

(22) Filed: Sep. 27, 2002

(65) Prior Publication Data
US 2003/0083457 A1    May 1, 2003

(30) Foreign Application Priority Data
Oct. 26, 2001   (DE)   ................ 101 52 294

(51) Int. Cl.
*C08J 3/03*       (2006.01)
*C08G 18/10*      (2006.01)
*C08G 18/12*      (2006.01)
*C08G 18/34*      (2006.01)
*C08G 18/38*      (2006.01)

(52) U.S. Cl. .............. 524/591; 524/839; 524/840; 528/49; 528/59; 528/60; 528/71

(58) Field of Classification Search .............. 524/591, 524/839, 840; 528/71, 49, 59, 60
See application file for complete search history.

(56) References Cited

U.S. PATENT DOCUMENTS

| | | | |
|---|---|---|---|
| 3,124,605 A | 3/1964 | Wagner | |
| 3,358,010 A | 12/1967 | Britain | |
| 3,903,126 A | 9/1975 | Woerner | |
| 3,903,127 A | 9/1975 | Wagner | |
| 3,976,622 A | 8/1976 | Wagner | |
| 4,046,729 A * | 9/1977 | Scriven et al. ............. 524/589 |
| 4,066,591 A * | 1/1978 | Scriven et al. ............. 524/840 |
| 4,324,879 A | 4/1982 | Bock | |
| 5,326,815 A * | 7/1994 | Serdiuk et al. ............ 524/591 |
| 5,342,882 A * | 8/1994 | Gobel et al. ............... 524/832 |
| 5,569,707 A * | 10/1996 | Blum et al. ................. 524/591 |

FOREIGN PATENT DOCUMENTS

| | | |
|---|---|---|
| DE | 20 20 905 C1 | 2/1971 |
| DE | 23 14 513 A1 | 10/1974 |
| DE | 26 24 442 B2 | 12/1976 |
| DE | 29 28 552 A1 | 1/1981 |
| DE | 31 24 784 C2 | 4/1982 |
| DE | 196 30 905 A1 | 2/1998 |
| DE | 199 07 988 A1 | 8/2000 |
| EP | 0 120 466 A1 | 10/1984 |
| EP | 0 590 484 A1 | 4/1994 |
| EP | 0 669 352 A1 | 8/1995 |

* cited by examiner

*Primary Examiner*—Rabon Sergent
(74) *Attorney, Agent, or Firm*—Connolly Bove Lodge & Hutz LLP

(57) ABSTRACT

A water-dispersible polyurethane resin comprising building blocks derived from polyisocyanates A, polyols B having a number-average molar mass $M_n$ of at least 400 g/mol, where appropriate, low molar mass polyols C with $M_n$ below 400 g/mol, compounds D which possess at least two groups which are reactive toward isocyanate groups and at least one group which is capable of forming anions, low molar mass polyols E which in relation to isocyanate groups carry no further reactive groups, compounds F, which are monofunctional toward isocyanates or contain active hydrogen of different reactivity and are different from the compounds E and also, where appropriate, compounds G, which are different from B, C, D, E and F and contain at least two groups which are reactive with NCO groups, wherein the number-average molar mass $M_n$ of the polyurethane resin is at least 10 kg/mol, its weight-average molar mass $M_w$ is at least 20 kg/mol, and its acid number is from 20 to 50 mg/g; a process for its preparation; and its use as a binder.

14 Claims, No Drawings

HIGH MOLAR MASS POLYURETHANE DISPERSIONS

FIELD OF THE INVENTION

This invention is directed to high molar mass polyurethane dispersions, a process for their production, and the use thereof.

BACKGROUND OF THE INVENTION

Aqueous polyurethane dispersions are widely used as binders for aqueous paints. Among these paints there is knowledge of one-component systems, which dry physically (by evaporation of the water), the formation of a film being assisted where appropriate by addition of thermally activated crosslinking agents (baking varnishes, curing with melamine resins or blocked isocyanates at temperatures above 120 to 140° C.); and two-component systems, where hydroxy-functional binder constituents are mixed with non-blocked isocyanates immediately prior to application and the crosslinking reaction takes place at room temperature (or at an elevated temperature in order to accelerate the cure). In the latter case it is also possible to emulsify the nonblocked isocyanate in the aqueous dispersion of the hydroxy-functional binder component, without any premature reaction of the two components.

Physically drying polyurethane dispersions are obtained, conventionally, by chain extending an isocyanate-functional prepolymer in the aqueous phase by means of polyfunctional compounds of low molar mass dissolved in water, referred to as chain extenders, such as diamines or dihydrazides.

In the case of solvent borne physically drying systems of this kind, high-viscosity solutions with a relatively low solids content are applied. The paints based on such systems dry rapidly to give tough, elastic films which exhibit possessing good solvent resistance. These paints are used to coat flexible substrates such as synthetic leathers and, for example, magnetic tapes and magnetic foils.

Coatings obtained from the existing aqueous systems are still inferior to those from solvent borne systems.

The object is therefore to provide aqueous polyurethane dispersions which dry physically to give tough, elastic films with good solvent resistance.

This object is achieved by means of a particularly high molar mass, water-dispersible polyurethane resin.

SUMMARY OF THE INVENTION

The invention accordingly provides a water-dispersible polyurethane resin which has a number-average molar mass $M_n$ (measured by gel permeation chromatography, calibration with polystyrene standards) of at least 10 kg/mol, preferably at least 15, and with particular preference at least 20 kg/mol, and a weight-average molar mass $M_w$ of at least 20 kg/mol, preferably at least 30, and with particular preference at least 40 kg/mol. The acid number of the resins of the invention, defined in accordance with DIN 53 402 as the ratio of the mass $m_{KOH}$ of potassium hydroxide required to neutralize a sample under analysis to the mass $m_B$ of that sample (mass of the solid in the sample in the case of solutions or dispersions), is preferably from 20 to 50 mg/g, in particular from 25 to 45 mg/g.

DETAILED DESCRIPTION OF THE PREFERRED EMBODIMENTS

The polyurethane resin comprises building blocks derived from polyisocyanates A, polyols B having a number-average molar mass $M_n$ of at least 400 g/mol, where appropriate, low molar mass polyols C with $M_n$ below 400 g/mol, compounds D which possess at least two groups which are reactive toward isocyanate groups and at least one group which is capable of forming anions, low molar mass polyols E which carry no further groups which are reactive towards isocyanate, compounds F which are monofunctional toward isocyanates or contain active hydrogen of different reactivity and are different from the compounds E and also, where appropriate, compounds G, which are different from B, C, D, E and F and contain at least two groups which are reactive towards NCO groups.

Particularly good results are obtained if the number-average molar mass of the polyurethane resin is at least 25 kg/mol.

The weight-average molar mass $M_w$ is more than 50 kg/mol, preferably at least 51, and in particular at least 55 kg/mol.

The invention further provides a process for preparing high molar mass, water-dispersible polyurethane resins, which comprises the steps of synthesizing an isocyanate-functional prepolymer by reacting polyisocyanates A with polyols B having a number-average molar mass $M_n$ of at least 400 g/mol, where appropriate, low molar mass polyols C, and compounds D which contain at least two isocyanate-reactive groups and at least one group capable of forming anions, to give a prepolymer which contains free NCO groups and has a Staudinger index $J_0$ of at least 20 cm$^3$/g, preferably at least 23 cm$^3$/g, and with particular preference at least 26 cm$^3$/g, at least partly neutralizing the group capable of forming anions in the compound D, to form anionic groups, dispersing this prepolymer in water, and reacting the neutralized prepolymer with at least one of the components selected from low molar mass polyols E which carry no further groups reactive towards isocyanate, these compounds being used in excess, compounds F which are monofunctional toward isocyanates or contain active hydrogen of different reactivity and are different from the compounds E, and also, where appropriate, compounds G, which are different from B, C, D, E, and F and contain at least two groups which are reactive with NCO groups.

The Staudinger index of the prepolymer formed in step 1, measured in N-methylpyrrolidone/chloroform as a solvent, may in particular have values even higher than those specified above. In fact, particularly good properties, especially with respect to the initial drying rate, are obtained if $J_0$ is at least 30 cm$^3$/g, preferably at least 33 cm$^3$/g, and in particular at least 35 cm$^3$/g. The formerly so-called "intrinsic viscosity number", called "Staudinger index" $J_0$ in accordance with DIN 1342, Part 2.4, is the limiting value of the Staudinger function $J_v$ at decreasing concentration and shear stress, $J_v$ being the relative change in viscosity based on the mass concentration $\beta_B = m_B/V$ of the dissolved substance B (with the mass $m_B$ of the substance in the volume V of the solution), i.e., $J_v = (\eta_r - 1)/\beta_B$. In this formula, $\eta_r - 1$ denotes the relative change in viscosity, in accordance with $\eta_r - 1 = (\eta - \eta_s)/\eta_s$. The relative viscosity, $\eta_r$, is the ratio of the viscosity $\eta$ of the solution under analysis to the viscosity $\eta_s$ of the pure solvent. (The physical meaning of the Staudinger index is that of a specific hydrodynamic volume of the solvated polymer coil at infinite dilution and in the state of rest.) The unit commonly used for J is "cm$^3$/g"; often also "ml/g" or "dl/g".

The invention further provides paints which comprise these polyurethane resins as binders, although it is also possible where appropriate to use other binders as well in a mixture with these polyurethane resins; coatings produced with these paints; and films obtainable by applying paints comprising the polyurethane resins of the invention to nonadhesive surfaces and stripping the solvents from these surfaces after drying and/or after curing.

The isocyanates A are at least difunctional and may be selected from the group consisting of aromatic and aliphatic linear, cyclic, and branched isocyanates, especially diisocyanates. Where aromatic isocyanates are used, they must be employed in a mixture with the stated aliphatic isocyanates. The fraction of the aromatic isocyanates is to be chosen such that the number of isocyanate groups they introduce into the mixture is at least 5% less than the number of isocyanate groups which remain in the resulting prepolymer after the first stage. Preference is given to diisocyanates, in which case it is possible for up to 5% of their mass to be replaced by isocyanates with a functionality of three or more.

The diisocyanates preferably possess the formula Q(NCO)$_2$, in which Q stands for a hydrocarbon radical having from 4 to 40 carbon atoms, in particular from 4 to 20 carbon atoms, and preferably denotes an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms or an araliphatic hydrocarbon radical having from 7 to 15 carbon atoms. Examples of such diisocyanates which can be used with preference are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate, IPDI), 4,4'-diisocyanatodicyclohexylmethane, 4,4'-diisocyanato-dicyclohexylpropane-(2,2), 1,4-diisocyanatobenzene, 2,4- or 2,6-diisocyanatotoluene or mixtures of these isomers, 4,4'- or 2,4'-diisocyanatodiphenylmethane, 4,4'-diisocyanato-diphenylpropane-(2,2), p-xylylene diisocyanate, and α,α,α',α'-tetramethyl-m- or -p-xylylene diisocyanate, and mixtures of these compounds.

As well as these simple polyisocyanates, suitable polyisocyanates include those which contain heteroatoms in the radical linking the isocyanate groups. Examples thereof are polyisocyanates containing carbodiimide groups, allophanate groups, isocyanurate groups, urethane groups, acylated urea groups or biuret groups. For further suitable polyisocyanates, refer for example to DE-A 29 28 552.

Also suitable are "paint polyisocyanates" based on hexamethylene diisocyanate or on 1-isocyanato-3,3,5-trimethyl-4-isocyanatomethylcyclohexane (IPDI) and/or bis(isocyanatocyclohexyl)methane, especially those based exclusively on hexamethylene diisocyanate. "Paint polyisocyanates" on the basis of these diisocyanates are those derivatives of these diisocyanates that are known per se and contain biuret, urethane, uretdione and/or isocyanurate groups and that, following their preparation, have been freed where appropriate from excess starting diisocyanate in a known way, preferably by distillation, down to a residual mass fraction of less than 0.5%. The preferred aliphatic polyisocyanates for use in accordance with the invention include polyisocyanates which meet the above criteria, contain biuret groups, and are based on hexamethylene diisocyanate, such as may be obtained, for example, by the processes of U.S. Pat. Nos. 3,124,605, 3,358,010, 3,903,126, 3,903,127 or 3,976,622, which are composed of mixtures of N,N,N-tris(6-isocyanatohexyl) biuret with minor amounts of its higher homologs, and also the cyclic trimers of hexamethylene diisocyanate which meet the stated criteria and can be obtained in accordance with U.S. Pat. No. 4,324,879, and which are composed essentially of N,N,N-tris(6-isocyanatohexyl) isocyanurate in a mixture with minor amounts of its higher homologs. Particular preference is given to mixtures of polyisocyanates which meet the stated criteria, contain uretdione and/or isocyanurate groups, and are based on hexamethylene diisocyanate, such as are formed by catalytic oligomerization of hexamethylene diisocyanate using trialkylphosphanes. Particular preference is given to the last-mentioned mixtures with a viscosity at 23° C. of from 50 to 20 000 mPa·s and an NCO functionality of between 2.0 and 5.0.

The aromatic polyisocyanates which are likewise suitable in accordance with the invention but are preferably to be used in a mixture with the abovementioned aliphatic polyisocyanates include in particular "paint polyisocyanates" based on 2,4-diisocyanatotoluene or its technical-grade mixtures with 2,6-diisocyanatotoluene or on 4,4-diisocyanatodiphenylmethane and/or its mixtures with its isomers and/or higher homologs. Aromatic paint polyisocyanates of this kind are, for example, the isocyanates which contain urethane groups, such as are obtained by reacting excess amounts of 2,4-diisocyanatotoluene with polyhydric alcohols such as trimethylolpropane and then where appropriate removing the unreacted diisocyanate excess by distillation. Examples of further aromatic paint polyisocyanates are the trimers of the monomeric diisocyanates exemplified, i.e., the corresponding isocyanato-isocyanurates, which following their preparation may have been freed, preferably by distillation, from excess monomeric diisocyanates. In the mixtures of aromatic and (cyclo)aliphatic isocyanates, the amounts of these two components are chosen such as to ensure that the isocyanate groups of the prepolymer are exclusively or at least 90% (cyclo)aliphatically attached.

The polyisocyanate component A may further be composed of any desired mixtures of the polyisocyanates exemplified.

The mass fraction of building blocks derived from the polyisocyanates A in the polyurethane resin is generally from about 10 to 50%, preferably from 20 to 35%, based on the mass of the polyurethane resin.

The polyols B preferably possess a number-average molar mass $M_n$ of from 400 to 5 000 g/mol, in particular from 800 to 2 000 g/mol. Their hydroxyl number is generally from 30 to 280, preferably from 40 to 200, and in particular from 50 to 160 mg/g. It is preferred to use exclusively difunctional polyols B; however, up to 5% of the mass of the polyols B may also be replaced by polyols with a functionality of three or more.

The hydroxyl number is defined in accordance with DIN 53 240 as the ratio of the mass $m_{KOH}$ of potassium hydroxide which has exactly the same number of hydroxyl groups as a sample under analysis to the mass $m_B$ of that sample (mass of the solid in the sample in the case of solutions or dispersions); its customary unit is "mg/g".

Examples of such polyols, which are the compounds known from polyurethane chemistry, are polyether polyols, polyester polyols, polycarbonate polyols, polyesteramide polyols, polyamidoamide polyols, epoxy resin polyols and their reaction products with $CO_2$, polyacrylate polyols, and the like. Polyols of this kind, which may also be used as a mixture, are described, for example, in the laid-open DE specifications 20 20 905, 23 14 513, and 31 24 784, and also in EP-A 0 120 466. It is likewise possible to use castor oil as a polyol component.

Of these polyols, preference is given to the polyether and polyester polyols, especially those which contain only terminal OH groups and possess a functionality of less than 3, preferably of from 2.8 to 2, and in particular of 2.

Examples of polyether polyols here include polyoxyethylene polyols, polyoxypropylene polyols, polyoxybutylene polyols, mixed and block copolymers of these, and, preferably, polytetrahydrofurans containing terminal OH groups.

The polyester polyols which are particularly preferred in accordance with the invention are the known polycondensates of organic dihydroxy and also, where appropriate, polyhydroxy (trihydroxy, tetrahydroxy) compounds and dicarboxylic and also, where appropriate, polycarboxylic (tricarboxylic, tetracarboxylic) acids or hydroxy carboxylic acids or lactones. Instead of the free polycarboxylic acids it is also possible to use the corresponding polycarboxylic anhydrides or corresponding polycarboxylic esters of lower alcohols to prepare the polyesters. Examples of suitable diols are ethylene glycol, 1,2-butanediol, diethylene glycol, triethylene glycol, polyalkylene glycols, such as polyethylene glycol, and also 1,2- and 1,3-propanediol, 1,4-butanediol, 1,6-hexanediol, neopentyl glycol or neopentyl glycol hydroxypivalate. As polyols which may be employed additionally, having three or more hydroxyl groups in the molecule, examples to be mentioned here include trimethylolpropane, trimethylolethane, glycerol, erythritol, pentaerythritol, ditrimethylolpropane, dipentaerythritol, trimethylolbenzene or trishydroxyethyl isocyanurate.

Suitable dicarboxylic acids include aromatic and cycloaliphatic dicarboxylic acids, linear and branched alkyl- and alkenyl-dicarboxylic acids, and dimeric fatty acids. The following are suitable examples: phthalic acid, isophthalic acid, terephthalic acid, tetrahydrophthalic acid, hexahydrophthalic acid, 1,4-cyclohexanedicarboxylic acid, adipic acid, succinic acid, azelaic acid, sebacic acid, glutaric acid, "Chlorendic" acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid, octenylsuccinic acid and dodecenylsuccinic acid. Anhydrides of these acids can likewise be used where they exist. The anhydrides are embraced here by the term "acid". It is also possible to use minor amounts (mole fraction up to 10%, based on the amount of substance of all acids) of monocarboxylic acids, such as benzoic acid and hexanecarboxylic acid. Saturated aliphatic or aromatic acids are preferred, such as adipic acid or isophthalic acid. As polycarboxylic acids to be used where appropriate in relatively small amounts, mention may be made here of trimellitic acid, trimesic acid, pyromellitic acid, and also polyanhydrides, as described in DE 28 11 913, or mixtures of two or more of such compounds.

The hydroxy carboxylic acids, which can be used as coreactants in the preparation of a polyester polyol containing terminal hydroxyl groups, are, for example, hydroxycaproic acid, and hydroxybutyric acid, hydroxydecanoic acid, hydroxystearic acid. Lactones which can be used in the synthesis of the polyester polyols include caprolactone, butyrolactone, and valerolactone.

The mass fraction of building blocks derived from component B in the polyurethane resin is customarily between 15 and 80%, preferably between 40 and 60%, based on the mass of the polyurethane resin.

The low molar mass polyols C which are used where appropriate for synthesizing the polyurethane resins have the general effect of stiffening the polymer chain. They generally possess a molar mass of from about 60 to 400 g/mol, preferably from 60 to 200 g/mol, and hydroxyl numbers of from 200 to 1500 mg/g. They may contain aliphatic, alicyclic or aromatic groups. Their mass fraction, where used, is generally from 0.5 to 20%, preferably from 1 to 10%, based on the mass of the hydroxyl-containing components B to D. Suitable, for example, are the low molar mass polyols having up to about 20 carbon atoms per molecule, examples being ethylene glycol, diethylene glycol, 1,2-propanediol, 1,3-propanediol, 1,4-butanediol, 1,2- and 1,3-butylene glycol, 1,2- and 1,4-cyclohexanediol, 1,4-cyclohexanedimethanol, 1,6-hexanediol, bisphenol A (2,2-bis(4-hydroxyphenyl) propane), hydrogenated bisphenol A (2,2-bis(4-hydroxycyclohexyl)propane) and mixtures thereof, and also, as triols, trimethylolethane and trimethylolpropane. It is preferred to use exclusively or at least predominantly (generally more than 90% of the mass, preferably more than 95%) diols.

Where compounds with a functionality of three or more are used as compounds A, B and/or C, it should be ensured when synthesizing the prepolymer that no gelling occurs. This can be prevented, for example, by using monofunctional compounds together with the trifunctional or higher polyfunctional compounds, the amount of the monofunctional compounds in that case being chosen preferably such that the average functionality of the component in question does not exceed 2.3, preferably 2.2, and in particular 2.1.

The anionogenic compounds D contain at least one and preferably at least two isocyanate-reactive groups such as hydroxyl, amino, and mercaptan groups and at least one acid group which forms anions on at least partial neutralization in aqueous solution or dispersion. Such compounds are described, for example, in U.S. Pat. Nos. 3,412,054 and 3,640,924 and also in the laid-open DE specifications 26 24 442 and 27 44 544, hereby incorporated by reference. Particularly suitable for this purpose are polyols, preferably diols, which contain at least one carboxyl group, generally from 1 to 3 carboxyl groups, per molecule. Other groups capable of forming anions suitably include sulfonic acid groups and phosphonic acid groups. Particular examples of compounds D are dihydroxy carboxylic acids, such as $\alpha,\alpha$-dialkylolalkanoic acids, especially $\alpha,\alpha$-dimethyloialkanoic acids such as 2,2-dimethylolacetic acid, 2,2-dimethylolpropionic acid, 2,2-dimethylolbutyric acid, 2,2-dimethylolpentanoic acid, and the isomeric tartaric acids, and also polyhydroxy acids such as gluconic acid. Particularly preferred in this context is 2,2-dimethylolpropionic acid. Examples of amino-containing compounds D are 2,5-diaminovaleric acid (ornithine) and 2,4-diaminotoluene-5-sulfonic acid. It is also possible to employ mixtures of the compounds D mentioned. The mass fraction of building blocks derived from component D in the polyurethane resin is generally from 2 to 20%, preferably from 4 to 10%, based on the mass of polyurethane resin.

The compounds E are located predominantly, preferably at from 70 to 90%, at the ends of each of the molecule chains, which they terminate (chain terminators). Suitable polyols are also of low molar mass ($M_n$ as in component C) and possess at least three, preferably three or four, hydroxyl groups in the molecule. Examples that may be mentioned here include glycerol, hexanetriol, pentaerythritol, dipentaerythritol, diglyerol, trimethylolethane and trimethylolpropane, the latter being preferred. As a chain terminator, component E is used in excess, in other words in an amount such that the number of hydroxyl groups in the amount of component E used exceeds that of the isocyanate groups still present in the prepolymer ABCD. The mass fraction of building blocks derived from component E in the polyurethane resin is customarily between 2 and 15%, preferably from 5 to 15%, based on the mass of the polyurethane resin. Where appropriate, building blocks derived from component E are present in the polyurethane resin in a mixture with the building blocks derived from F and/or G.

The compounds F are monofunctional compounds which are reactive with NCO groups, such as monoamines, especially mono-secondary amines, or monoalcohols. Examples that may be mentioned here include the following: methylamine, ethylamine, n-propylamine, n-butylamine, n-octylamine, laurylamine, stearylamine, isononyloxypropylamine, dimethylamine, diethylamine, di-n- and di-isopropylamine, di-n-butylamine, N-methylaminopropylamine, diethyl- and dimethylaminopropylamine, morpholine, piperidine, and suitably substituted derivatives thereof, amidoamines formed from diprimary amines and monocarboxylic acids, and monoketimines of diprimary amines, and primary/tertiary amines, such as N,N-dimethylaminopropylamine.

Suitable compounds F preferably include those containing active hydrogen with a reactivity which differs with respect to NCO groups, especially compounds which contain not only a primary amino group but also secondary amino groups, or which contain not only an OH group but also COOH groups or not only an amino group (primary or secondary) but also OH groups, the latter being particularly preferred. Examples of such compounds include the following: primary/secondary amines, such as 3-amino-1-methylaminopropane, 3-amino-1-ethylaminopropane, 3-amino-1-cyclohexylaminopropane, 3-amino-1-methylaminobutane; monohydroxy carboxylic acids, such as hydroxyacetic acid, lactic acid or malic acid, and also alkanolamines such as N-aminoethylethanolamine, ethanolamine, 3-aminopropanol, neopentanolamine, and, with particular preference, diethanolamine. It is of course also possible where appropriate to use compounds F which in addition to the isocyanate-reactive groups contain olefinic double bonds. Following application to a substrate, the polyurethanes thus obtained can be crosslinked by the action of high-energy radiation such as UV rays or electron beams.

As in the case of compounds E, it is possible in this way to introduce additional functional groups into the polymeric end product and so to make this product more reactive toward materials, such as curatives, if desired. The mass fraction of building blocks derived from component F in the polyurethane resin is customarily between 2 and 20%, preferably 3 and 10%, based on the mass of the polyurethane resin.

The compounds G are the so-called chain extenders. Suitable such compounds include the NCO-reactive and preferably difunctional compounds which are known for this purpose, which are not identical with B, C, D, E, and F, and which normally have number-average molar masses of up to 400 g/mol. Examples that may be mentioned here include water, hydrazine, dihydrazides of dicarboxylic acids such as adipic dihydrazide, diamines such as ethylenediamine, 1,3-diaminopropane, 1,4-diaminobutane, and hexamethylenediamine, it being possible for the amines to carry substituents as well, such as OH groups. Such polyamines are described, for example, in the laid-open DE specification 36 44 371. The mass fraction of building blocks derived from component G in the polyurethane resin is customarily between 1 and 10%, preferably 2 and 5%, based on the mass of the polyurethane resin.

The polyurethane resin of the invention is preferably prepared by first preparing, from the polyisocyanates A, the polyols B, and, where appropriate, the low molar mass polyols C and also the compounds D, a polyurethane prepolymer containing on average per molecule at least 1.7, preferably from 2 to 2.5, free isocyanate groups, then reacting this prepolymer with the compounds E and/or F, where appropriate in a blend with small amounts of compounds G, in a nonaqueous system, component E being employed in a stoichiometric excess (the number of hydroxyl groups in E is greater than the number of isocyanate groups in the prepolymer prepared in the first step), and preferably, finally neutralizing the fully reacted polyurethane resin and converting it into an aqueous system. If desired, the reaction with G may also take place following the conversion to an aqueous system. The prepolymer ought in that case to already be of high molar mass, preferably having a Staudinger index $J_0$ of at least 20 cm$^3$/g, more preferably at least 23 cm$^3$/g, and with particular preference at least 26 cm$^3$/g.

The preparation of the polyurethane prepolymers in the first step takes place in accordance with the known techniques. The polyfunctional isocyanate A is used in an excess over the polyols B to D, so giving a product containing free isocyanate groups. These isocyanate groups are terminal and/or pendant, preferably terminal. The amount of polyisocyanate A is appropriately such that the ratio of the number of isocyanate groups in the amount of component A used to the total number of the OH groups in the polyols B to D used is from 1.05 to 1.4, preferably from 1.1 to 1.3.

The reaction for preparing the prepolymer is normally conducted at temperatures from 60 to 95° C., preferably from 60 to 75° C., depending on the reactivity of the isocyanate used, generally in the absence of a catalyst, but preferably in the presence of solvents which are inert toward isocyanates. Solvents particularly suitable for this purpose are those which are compatible with water, such as the ethers, ketones, and esters, mentioned later on below, and also N-methylpyrrolidone. The mass fraction of this solvent appropriately does not exceed 30% and is preferably situated within the range from 5 to 20%, based in each case on the sum of the masses of the polyurethane resin and the solvent. It is appropriate to add the polyisocyanate to the solution of the other components. It is, however, likewise possible first to add the polyisocyanate A to the polyol B and, where appropriate C and to react the prepolymer ABC thus produced with component D, which is in solution in a solvent inert toward isocyanates, preferably N-methylpyrrolidone or ketones, to give the prepolymer ABCD.

The prepolymer ABCD or its solution is then reacted with compounds E and/or F, where appropriate in a blend with G, the temperature being appropriately in the range from 50 to 130° C., preferably between 70 and 110° C., until the NCO content in the reaction mixture has fallen virtually to zero. If compound E is employed, then it is added in excess (number of hydroxyl groups in E exceeds the number of isocyanate groups in the prepolymer ABCD). The amount of E is appropriately such that the ratio of the number of NCO groups in the prepolymer ABCD or of the prepolymer ABCD(F/G) if already reacted beforehand with compounds F and/or G to the number of reactive groups of E is from 1:1.05 to 1:5, preferably from 1:1 to 1:3. The mass of F and/or G can be from 0 to 90%, preferably from 0 to 20%, based on the mass of E.

Some of the (non-neutralized) acid groups attached in the polyurethane thus prepared, preferably from 5 to 30%, may where appropriate be reacted with difunctional compounds which are reactive with acid groups, such as diepoxides.

Particularly suitable for neutralizing the resultant, preferably COOH-containing polyurethane are tertiary amines, e.g., trialkylamines having from 1 to 12, preferably from 1 to 6, carbon atoms in each alkyl radical. Examples of these are trimethylamine, triethylamine, methyldiethylamine, and tripropylamine. The alkyl radicals may for example also carry hydroxyl groups, as in the case of the dialkylmonoalkanolamines, alkyldialkanolamines, and trialkanolamines. An example thereof is dimethylethanolamine, which is used preferably as the neutralizing agent.

Where the chain extension is carried out in organic phase, or where neutralization and chain extension are carried out together with dispersion in one step, neutralizing agents used may where appropriate also include inorganic bases, such as ammonia or sodium hydroxide and/or potassium hydroxide.

The neutralizing agent is usually used in amounts such that the ratio of the amount of substance of amine groups and/or hydroxyl ions formed in aqueous solution to the amount of substance of the acid groups of the prepolymer is from about 0.3:1 to 1.3:1, preferably from about 0.5:1 to 1:1.

Neutralization, which generally takes place between room temperature and 110° C., can be carried out in any manner desired: for example, by adding the aqueous neutralizing agent to the polyurethane resin or vice versa. It is, however, also possible first to add the neutralizing agent to the polyurethane resin and only then to add the water. In general, a mass fraction of solids in the dispersion of from 20 to 70% is obtained in this way, preferably from 30 to 50%.

The polyurethane resin of the invention is suitable as a sole binder or else in a mixture with other binders such as the customary, relatively low molar mass polyurethane resins or other aqueous, physically drying resins or resins which cure by addition of curatives which are effective at room temperature or elevated temperature for the formulation of aqueous coating compositions. The mass fraction of the polyurethane resin of the invention in the aqueous coating material is generally from 5 to 40%, preferably from 15 to 30%, based on the mass of the overall coating material.

It is likewise possible when using the polyurethane resin of the invention as the sole binder to add a curative such as polyfunctional isocyanates (curing at room temperature or slightly elevated temperature) in order to raise the cure rate. Formulation as a thermosetting one-component binder with amine resins or blocked isocyanates as curatives is also possible and advantageous.

For the formulation of aqueous coating compositions, the customary auxiliaries and additives of paint technology are incorporated into the aqueous dispersion of the polyurethane resin. These auxiliaries and additives include, for example, defoamers, leveling agents, pigments, and pigment dispersing agents.

The resultant coating compositions of the invention are suitable for virtually all fields of use in which nowadays use is made of solvent borne, solvent free or other aqueous painting and coating systems with an elevated profile of properties, where the substrates to be coated may be composed, for example, of metal, mineral building materials, such as lime, cement or plaster, fiber cement building materials, concrete, wood or wood materials, paper, asphalt, bitumen, plastics of diverse kinds, textiles or leather. The metallic substrates are in all cases preferably automobiles.

The coatings produced therewith are notable for drastically increased toughness and elasticity, and also enhanced chemical stability and low abrasion. Also worthy of emphasis is the considerably higher initial drying rate achievable with the polyurethane resin dispersions of the invention: in comparison to the known polyurethane dispersions, this rate is higher by a factor of from 10 to 100.

EXAMPLES

Example 1

132 g of adipic acid, 72 g of isophthalic acid, 142 g of 1,6-hexanediol and 42 g of neopentyl glycol were charged to a 1 L round-bottomed glass flask and heated slowly to 250° C., during which the water of reaction was removed by distillation. The batch was held at this temperature until the acid number was below 10 mg/g. Condensation was then continued under reduced pressure until the acid number lay below 2 mg/g. This gave a clear polyester having a hydroxyl number of about 77 mg/g.

Example 2

213 g of the polyester from example 1, 26.8 g of dimethylolpropionic acid and 10.4 g of neopentyl glycol were dissolved together in 65.3 g of N-methylpyrrolidone at 100° C. To this solution there were added 119.4 g of isophorone diisocyanate; the mixture was held at this temperature until a Staudinger index ("limiting viscosity") of from 28 to 30 cm$^3$/g was reached. The mixture was then cooled to 95° C., 10 g of triethylamine were added, and the mixture was homogenized by stirring. This solution was subsequently dispersed with 410 g of deionized water having a temperature of approximately 80° C. over the course of less than 10 minutes and immediately admixed with a solution of 3.1 g of ethylenediamine in 73 g of deionized water. Following a homogenization phase of 1 hour, the batch was cooled. This gave a fine dispersion having a mass fraction of nonvolatiles of 36%, a viscosity of approximately 2300 mPa·s and a pH of approximately 7.6. The acid number of the resin was approximately 30 mg/g; by means of gel permeation chromatography against polystyrene standards, the number-average molar mass $M_n$ was found to be 20.9 kg/mol and the weight-average molar mass $M_w$ 41.3 kg/mol.

Example 3

213 g of the polyester from example 1, 1.3 g of ethylene glycol, 26.8 g of dimethylolpropionic acid and 8.3 g of neopentyl glycol were mixed in 150 g of methyl isobutyl ketone at about 60° C. To this mixture there were added 119 g of isophorone diisocyanate and the resulting mixture was heated at from 100 to 120° C. The mixture was held at this temperature until a Staudinger index ("limiting viscosity") of from 28 to 30 cm$^3$/g was reached (after about 4.5 h). The solution was then cooled to 95° C. and 12.6 g of triethylamine were added. Following homogenization, dispersion was carried out with 808 g of deionized water having a temperature of approximately 80° C. Immediately thereafter, a solution of 3.1 g of ethylenediamine in 100 g of deionized water was added. After a holding time of 30 minutes at 80° C., 337 g of a mixture of methyl isobutyl ketone and water was distilled off under slightly reduced pressure. Cooling gave a fine dispersion having a mass fraction of solids of 34%, a viscosity of approximately 800 mPa·s and a pH of approximately 8.1. The acid number of the resin was approximately 30 mg/g; a number-average molar mass $M_n$ of more than 20 kg/mol and a weight-average molar mass $M_w$ of more than 40 kg/mol were found.

Example 4

213 g of the polyester from example 1, 26.8 g of dimethylolpropionic acid and 10.4 g of neopentyl glycol were mixed in 123 g of methyl isobutyl ketone at about 60° C. 119 g of isophorone diisocyanate were added to this mixture which was than held at 58–60° C. until a Staudinger index ("limiting viscosity") of from 28 to 30 cm$^3$/g had been reached (after about 29 h). 11.7 g of triethylamine were then added to the solution. Following homogenization, dispersion was carried out with 683 g of deionized water having a temperature of approximately 60° C. Immediately thereafter, a solution of 3.1 g of ethylenediamine in 100 g of deionized water was added. After a holding time of 60 minutes at 60° C., 195 g of a mixture of methyl isobutyl ketone and water were distilled off under reduced pressure. Cooling gave a fine dispersion having a mass fraction of solids of 34%, a viscosity of approximately 200 mPa·s and a pH of approximately 7.9. An acid number of approximately 30 mg/g; a number-average molar mass $M_n$ of more than 20 kg/mol and a weight-average molar mass $M_w$ of more than 40 kg/mol were found.

What is claimed is:

1. A process for preparing a polyurethane resin having a number-average molar mass Mn of at least 25 kg/mol, a weight-average molar mass Mw of at least 40 kg/mol, and an acid number of from 25 to 50 mg/g, which comprises performing the following steps in succession:

synthesizing an isocyanate-functional prepolymer by reacting polyisocyanates A with polyols B having a number-average molar mass Mn of at least 400 g/mol, and compounds D which contain at least two isocyanate-reactive groups and at least one group capable of forming anions, to give a prepolymer which contains free NCO groups and has a Staudinger index J0 of at least 20 cm3/g, at least partly neutralizing the group capable of forming anions in the compound D, to form anionic groups, dispersing this prepolymer ABD in water, and reacting the neutralized prepolymer with compounds F which are monofunctional toward isocyanates, and low molar mass polyols E having at least three hydroxyl groups, which compounds F are selected from the group consisting of mono-secondary amines, amidoamines formed from diprimary amines and monocarboxylic acids, monoketimines, and primary-tertiary amines, and which polyols E are selected from the group consisting of glycerol, hexanetriol, pentaerythritol, dipentaerythritol, diglycerol, trimethylol ethane and trimethylol propane, these compounds being used in such an amount that the number of hydroxyl groups in the amount of component E used exceeds the number of isocyanate groups still present in the prepolymer ABD, wherein the reactants are chosen such that the mass fraction of building blocks derived from A is from 20% to 35%, the mass fraction of building blocks derived from B is from 15% to 60%, the mass fraction of building blocks derived from E is from 2% to 15%, and the mass fraction of building blocks derived from F is from 2% to 20%, each based on the mass of the polyurethane resin.

2. The process of claim 1, wherein the isocyanates A are at least difunctional and are selected from the group consisting of aliphatic linear isocyanates, aliphatic branched isocyanates, aliphatic cyclic isocyanates and aromatic isocyanates, aromatic isocyanates being used only in combination with the aliphatic isocyanates mentioned.

3. The process of claim 1, wherein the polyols B possess a hydroxyl number of from 30 to 280 mg/g and are selected from the group consisting of polyester polyols, polyether polyols, polycarbonate polyols, polyacrylate polyols, and epoxy resin polyols.

4. The process of claim 1, wherein also polyols C are used in the synthesis of the prepolymer, the polyols C being selected from the group consisting of ethylene glycol, diethylene glycol, 1,2-propanediol, 1,3-propanediol, 1,4-butanediol, 1,2- and 1,3-butylene glycol, neopentyl glycol, 1,2- and 1,4-cyclohexanediol, 1,4-cyclohexanedimethanol, 1,6-hexanediol, bisphenol A (2,2-bis(4-hydroxyphenyl)propane), hydrogenated bisphenol A (2,2-bis(4-hydroxycyclohexy) propane), and mixtures thereof.

5. The process of claim 4, wherein the masses of the reactants are chosen such that the polyurethane formed comprises building blocks derived from the polyols C in a mass fraction of from 0.5 to 20%.

6. The process of claim 1, wherein the anionogenic compounds D are selected from the group consisting of 2,2-dimethylolacetic acid, 2,2-dimethylolpropionic acid, 2,2-dimethylolbutyric acid, 2,2-dimethylolpentanoic acid, and the isometric tartaric acids, from gluconic acid, 2,5-diaminovaleric acid (ornithine) and 2,4-diaminotoluene-5-sulfonic acid.

7. The process of claim 6, wherein the masses of the reactants are chosen such that the polyurethane formed comprises building blocks derived from the anionogenic compounds D in a mass fraction of from 2 to 20%.

8. The process of claim 1, wherein component E is trimethylolpropane.

9. The process of claim 1, wherein the masses of the reactants are chosen such that the polyurethane formed comprises building blocks derived from the compounds F in a mass fraction of from 3% to 10%.

10. A process for preparing a polyurethane resin having a number-average molar mass Mn of at least 25 kg/mol, a weight-average molar mass Mw of at least 40 kg/mol, and an acid number of from 25 mg/g to 50 mg/g, which comprises performing the following steps in succession:

synthesizing an isocyanate-functional prepolymer by reacting polyisocyanates A with polyols B having a number-average molar mass Mn of at least 400 g/mol, and compounds D which contain at least two isocyanate-reactive groups and at least one group capable of forming anions, to give a prepolymer which contains free NCO groups and has a Staudinger index J0 of at least 20 cm3/g, at least partly neutralizing the group capable of forming anions in the compound D, to form anionic groups, dispersing this prepolymer ABD in water, and reacting the neutralized prepolymer with compounds F and low molar mass polyols E having at least three hydroxyl groups, which compounds F are monofunctional compounds which are reactive with isocyanate groups, and are selected from the group consisting of monoamines and monoalcohols, and which polyols E are selected from the group consisting of glycerol, hexanetriol, pentaerythritol, dipentaerythritol, diglycerol, trimethylol ethane and trimethylol propane, wherein the amount of component E used is such that the ratio of the number of isocyanate groups still present in the prepolymer ABD after reaction with compounds F to the number of reactive groups of E is 1:1.05 to 1:5, and wherein the reactants are chosen such that the mass fraction of building blocks derived from A is from 20% to 35%, the mass fraction of building blocks derived from B is from 15% to 60%, the mass fraction of building blocks derived from E is from 2% to 15%, and the mass fraction of building blocks derived from F is from 2% to 20%, each based on the mass of the polyurethane resin.

11. A process for preparing a polyurethane resin having a number-average molar mass Mn of at least 25 kg/mol, a weight-average molar mass Mw of at least 40 kg/mol, and an acid number of from 25 mg/g to 50 mg/g, which comprises performing the following steps in succession:
  synthesizing an isocyanate-functional prepolymer by reacting polyisocyanates A with polyols B having a number-average molar mass Mn of at least 400 g/mol, and compounds D which contain at least two isocyanate-reactive groups and at least one group capable of forming anions, to give a prepolymer which contains free NCO groups and has a Staudinger index J0 of at least 20 cm3/g,
  at least partly neutralizing the group capable of forming anions in the compound D, to form anionic groups, dispersing this prepolymer ABO in water, and
  reacting the neutralized prepolymer with compounds G and low molar mass polyols E having at least three hydroxyl groups, which compounds G are selected from the group consisting of hydrazine, dihydrazides of dicarboxylic acids, diamines, and diamines which also carry OH substituents, and which polyols E are selected from the group consisting of glycerol, hexanetriol, pentaerythritol, dipentaerythritol, diglycerol, trimethylol ethane and trimethylol propane, wherein the amount of component E used is such that the ratio of the number of isocyanate groups still present in the prepolymer ABD after reaction with compounds G to the number of reactive groups of E is 1:1.05 to 1:5, and wherein the reactants are chosen such that the mass fraction of building blocks derived from A is from 20% to 35%, the mass fraction of building blocks derived from B is from 15% to 60%, the mass fraction of building blocks derived from E is from 2% to 15%, and the mass fraction of building blocks derived from G is from 1% to 10%, each based on the mass of the polyurethane resin.

12. A process for preparing a polyurethane resin having a number-average molar mass Mn of at least 25 kg/mol, a weight-average molar mass Mw of at least 40 kg/mol, and an acid number of from 25 mg/g to 50 mg/g, which comprises performing the following steps in succession:
  synthesizing an isocyanate-functional prepolymer by reacting polyisocyanates A with polyols B having a number-average molar mass Mn of at least 400 g/mol, and compounds D which contain at least two isocyanate-reactive groups and at least one group capable of forming anions, to give a prepolymer which contains free NCO groups and has a Staudinger index J0 of at least 20 cm3/g,
  at least partly neutralizing the group capable of forming anions in the compound D, to form anionic groups, dispersing this prepolymer ABD in water, and
  reacting the neutralized prepolymer with compounds F, compounds G and low molar mass polyols E having at least three hydroxyl groups, which compounds F are monofunctional compounds which are reactive with isocyanate groups, and are selected from the group consisting of monoamines and monoalcohols, which compounds G are selected from the group consisting of hydrazine, dihydrazides of dicarboxylic acids, diamines, and diamines which also carry OH substituents, and which polyols E are selected from the group consisting of glycerol, hexanetriol, pentaerythritol, dipentaerythritol, diglycerol, trimethylol ethane and trimethylol propane, wherein the amount of component E used is such that the ratio of the number of isocyanate groups still present in the prepolymer ABD after reaction with compounds F and compounds G to the number of reactive groups of E is 1:1.05 to 1:5, and wherein the reactants are chosen such that the mass fraction of building blocks derived from A is from 20% to 35%, the mass fraction of building blocks derived from B is from 15% to 60%, the mass fraction of building blocks derived from E is from 2% to 15%, the mass fraction of building blocks derived from F is from 2% to 20%, and the mass fraction of building blocks derived from G is from 1% to 10%, each based on the mass of the polyurethane resin.

13. The process of claim 12, wherein the compounds G are selected from the group consisting of hydrazine, ethylenediamine, 1,3-diaminopropane, 1,4-diaminobutane, and hexamethylenediamine.

14. The process of claim 13, wherein the masses of the reactants are chosen such that the polyurethane formed comprises building blocks derived from compounds G in a mass fraction of from 2% to 5%.

* * * * *

UNITED STATES PATENT AND TRADEMARK OFFICE
CERTIFICATE OF CORRECTION

PATENT NO.         : 7,157,519 B2                                    Page 1 of 1
APPLICATION NO. : 10/256929
DATED              : January 2, 2007
INVENTOR(S)        : Markus Schafheutle et al.

It is certified that error appears in the above-identified patent and that said Letters Patent is hereby corrected as shown below:

In Claim 4, at column 12, line 17, "hydrogenated bisphenol A (2,2-bis(4-hydroxycyclohexy)" should read -- hydrogenated bisphenol A (2,2-bis(4-hydroxycyclohexyl)--.

In Claim 11, at column 13, line 25, "dispersing this prepolymer ABO in water, and" should read -- dispersing this prepoylmer ABD in water, and --.

Signed and Sealed this

Third Day of April, 2007

JON W. DUDAS
*Director of the United States Patent and Trademark Office*